(12) United States Patent
Shah Khadri et al.

(10) Patent No.: US 12,313,024 B2
(45) Date of Patent: May 27, 2025

(54) MANUFACTURING OF A SINGLE PIECE ROCKET ENGINE

(71) Applicant: AGNIKUL COSMOS PRIVATE LIMITED, Tamil Nadu (IN)

(72) Inventors: Syed Peer Mohamed Shah Khadri, Tamil Nadu (IN); Srinath Ravichandran, Tamil Nadu (IN)

(73) Assignee: AGNIKUL COSMOS PRIVATE LIMITED, Chennai (IN)

( * ) Notice: Subject to any disclaimer, the term of this patent is extended or adjusted under 35 U.S.C. 154(b) by 0 days.

(21) Appl. No.: 18/033,428

(22) PCT Filed: Oct. 23, 2021

(86) PCT No.: PCT/IN2021/051010
§ 371 (c)(1),
(2) Date: Apr. 24, 2023

(87) PCT Pub. No.: WO2022/085033
PCT Pub. Date: Apr. 28, 2022

(65) Prior Publication Data
US 2023/0407821 A1    Dec. 21, 2023

(30) Foreign Application Priority Data
Oct. 23, 2020   (IN) .............................. 202041046382

(51) Int. Cl.
*F02K 9/64*   (2006.01)
*B22F 10/28*   (2021.01)
(Continued)

(52) U.S. Cl.
CPC ................ *F02K 9/64* (2013.01); *B22F 10/28* (2021.01); *B33Y 10/00* (2014.12); *B33Y 80/00* (2014.12); *B22F 10/80* (2021.01); *B33Y 50/00* (2014.12)

(58) Field of Classification Search
CPC ........... F02K 9/64; B33Y 10/00; B33Y 80/00; B33Y 50/00; B22F 10/28; B22F 10/80
See application file for complete search history.

(56) References Cited

U.S. PATENT DOCUMENTS 10,518,328 B2 * 12/2019 DeMuth .................. B22F 10/00
11,204,001 B2 * 12/2021 Wooldridge .............. F02K 9/92
(Continued)

OTHER PUBLICATIONS

Melle, Killian, Development and Test Firing of a One-Piece Additively Manufactured Liquid Rocket Engine, 2019 (Year: 2019).*
(Continued)

*Primary Examiner* — Kyle Robert Thomas

(57) ABSTRACT

Disclosed herein is a single piece, integrated, light weighted, cost-effective 3D printed engine for space vehicles. FIG. 5 illustrates an integrated engine that comprises a combustion chamber to burn the fuel, an injector plate (504) to inject the fuel to the combustion chamber, an igniter (502) to ignite the fuel mixture, a nozzle (506) to pass hot gas to produce thrust and cooling channels (508) for regenerative cooling, where all these components are fused to form a single piece integrated engine. The engine of the present invention eliminates the need of assembling the individual components. Further, the engine is additively manufactured with high grade aerospace materials. Thus, the cost and mass of the engine is reduced when compared to traditionally manufactured engines, which leads to frequent missions.

9 Claims, 10 Drawing Sheets

(51) Int. Cl.
     *B33Y 10/00*     (2015.01)
     *B33Y 80/00*     (2015.01)
     *B22F 10/80*     (2021.01)
     *B33Y 50/00*     (2015.01)

(56) References Cited

U.S. PATENT DOCUMENTS

2019/0086154 A1* 3/2019 Adriany ................. B33Y 80/00
2019/0283136 A1* 9/2019 Ruppenthal ............. B22F 10/66
2019/0299290 A1* 10/2019 Kuhns ...................... B22F 3/11

OTHER PUBLICATIONS

Slotwinski, J.A., Characterization of Metal Powders Used for Additive Manufacturing, 2014, Journal of Research of the National Institute of Standards and Technology (Year: 2014).*
Salmi, Bryce, 3D-Printing a Rocket, 2019, IEEE (Year: 2019).*
Kowen, Joseph, Powder removal: The Achilles heel of powder bed-based metal Additive Manufacturing, Jun. 1, 2019, Metal-AM.com (Year: 2019).*

* cited by examiner

FIG 1A
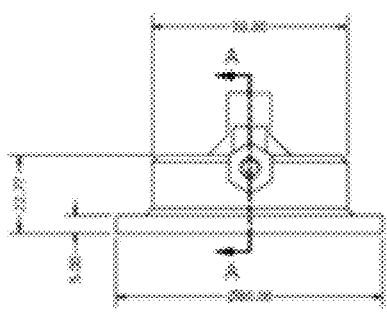
FIG 1B
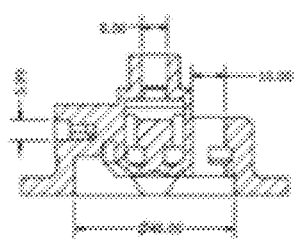
SECTION A-A
SCALE 1 : 1
FIG 1C
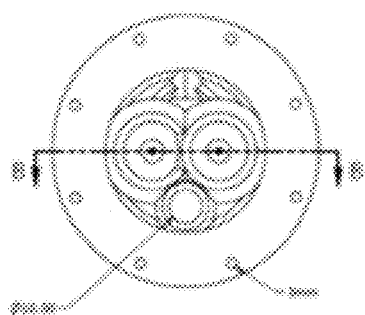
FIG 1D
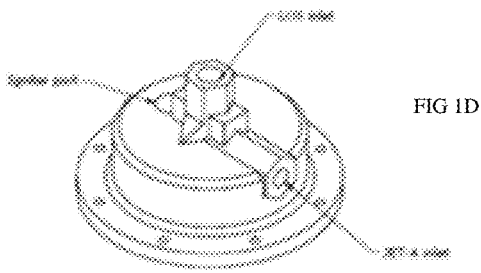
SECTION B-B
SCALE 1 : 1
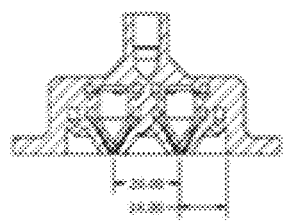
FIG 1E FIG 2A
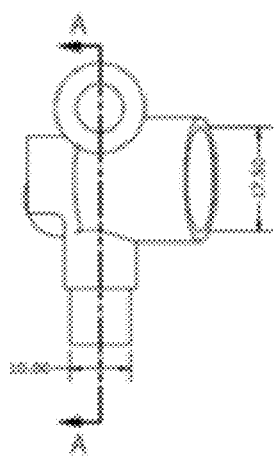
FIG 2B
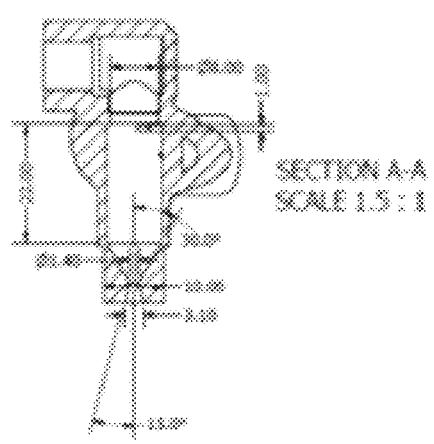
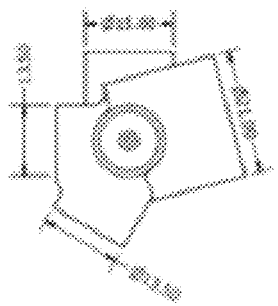
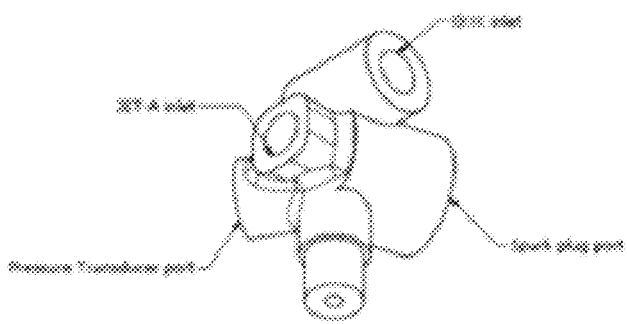
FIG 2C
FIG 2D FIG 3A
FIG 3B
FIG 3C
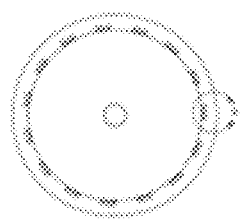
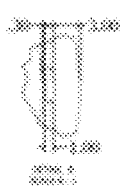
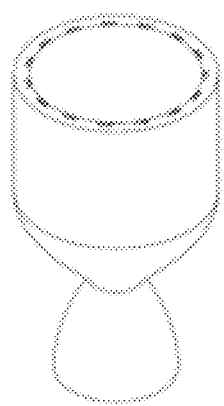
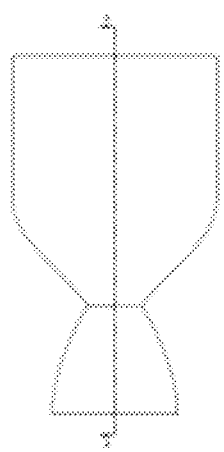
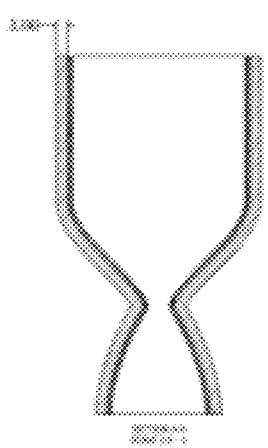
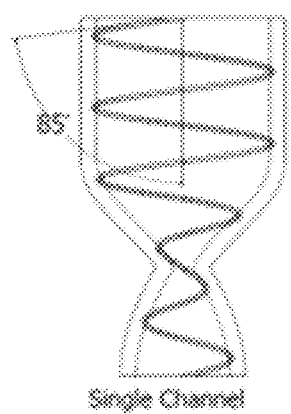
FIG 3D
FIG 3E
FIG 3F

MANUFACTURING OF A SINGLE PIECE ROCKET ENGINE

FIELD OF THE INVENTION

The present invention generally relates to propulsion engines in space vehicles. More particularly, it relates to a single piece, 3D printed, integrated propulsion engine used in a satellite launch vehicle.

BACKGROUND

Engines are mechanical devices which are used to convert one form of energy into mechanical energy. Especially, propulsion engines of space vehicles produce thrust to push an object forward. Thrust is the force required to move a rocket through air and space. Different types of engines develop thrust in different ways, but all thrust depends upon Newton's third law of motion. In any propulsion system, a stored propellant is accelerated and the reaction to this acceleration produces a force on the system. Hence, in order to produce the thrust the rocket propellants are mixed and exploded in the combustion chamber to produce a hot gas passing through the nozzles to produce the thrust.

Generally, there are two types of engines used in space vehicles based on the nature of the propellant. In case of liquid rocket, the propellants are stored separately and pumped into the combustion chamber where burning occurs whereas in case of solid rocket, the liquid propellants are mixed and kept in a solid cylinder. This stored solid propellant will burn only when exposed to an ignitor to produce thrust.

The conventional practices in the market for manufacturing a typical rocket engine is to make thousands of subcomponents carefully and then welding them or bracing them together. The injector elements, the components responsible for injecting fuel into the engine are separately made from about 6-7 pieces of metal on a Computer numerical control (CNC) machine. Then these pieces are carefully welded together to make one injector element. A typical rocket engine has tens to hundreds of injector elements. So, each separate injector element is carefully assembled on a metallic plate and then welded to the plate itself. Next, plumbing passages between the injector elements (small pipes or tubes) are carefully welded in the gaps. This extremely assembly heavy structure is called the injector plate. This injector plate is then welded to a cylindrical piece of metal called the combustion chamber. This integrated component is then again welded to the nozzle (which is separately made by forming or milling). Finally, cooling channels (metal tubes or pipes) are welded along the outside of the engine to allow for coolant flow. So, under the conventional practice a rocket engine is a sum total of about 1000 parts. Typically, an igniter is then separately added as well, making it even more complex to manufacture.

Hence, in order to produce the thrust, multiple components are required which further increases the mass and cost of the engine. Further, as mentioned, these multiple components should be assembled in an order using screws and bolts and fabricated carefully using techniques such as welding, bracing etc, where the requirement of manpower, equipment and cost are high.

Moreover, all the engine components are fabricated at various places using various materials, which consumes more time and cost. Further, the assembly of various components to form an engine is tedious and cumbersome.

Several prior art deal with fabrication of multiple components of an engine and assembling them to yield engine.

For example, European Patent Number 3019722 to Dacunha Nelson et. al., entitled "Plated Polymer Components for A Gas Turbine Engine" deals with a method to plate lightweight metal parts that can be incorporated into gas turbine engines comprising the steps of manually molding a polymer article having a desired geometry and plating the outer surface of the polymer article with metallic layers using electroless plating, electrolytic plating, or electroforming method.

U.S. patent Ser. No. 10/215,038 to Chen Yuntao et. al., entitled "Method and computer-readable model for additive manufacturing ducting arrangement for a gas turbine engine" deals with a method and computer-readable model for additive manufacturing a single component (i.e., ducting arrangement) for a gas turbine engine.

Even though the various parts of engine are produced using additive manufacturing (3D printing), none of the prior art deal with a single piece integrated engine produced by additive manufacturing thus eliminating the need for producing the various parts of engine separately.

Moreover, existing engine designs in additive manufacturing include iterations of multiple injector-igniter combinations. These parts again consist of multiple individual components that need to be assembled if being made by conventional additive manufacturing methods.

Hence, there is a need for a single integrated propulsion engine with optimized design manufactured by 3D printing methods that can be effectively used in space vehicles.

OBJECTS OF THE INVENTION

The primary object of the present invention is to provide a method of additively manufacturing a single piece, integrated, light weight engine for space vehicles.

Another object of the present invention is to provide a novel, optimized design for the engine that aids in depowdering the metallic powder in the engine without compromising the core engine design.

Yet another object of the invention is to provide a 3D printed engine manufactured as a single piece to eliminate the manpower used for assembling the engine parts and also helps in identifying errors in the engine.

Yet another object of the invention is to provide a highly reliable 3D printed single piece, integrated engine due to the avoidance of attachments points between different components.

Still another object of the present invention is to lower the mass of the 3D printed engine thereby to further reduce the cost of the satellite launching mission.

Still another object of the present invention is to fasten the turnaround time of engine fabrication by additive manufacturing, where the manufacturing method makes the assembly process quicker and thereby helps in frequent launches.

SUMMARY

To achieve the objects, the present invention provides a method for additively manufacturing a single piece, integrated engine.

The single piece, integrated engine comprises: a combustion chamber to burn the fuel, an injector plate to inject the fuel to the combustion chamber, an igniter to ignite the fuel mixture and a nozzle to pass the hot gas to produce thrust, where all of these components are integrated in their very creation process itself by additive manufacturing method.

According to present invention, the method of additively manufacturing a single piece engine comprises the steps of: generating the Computer-Aided Design (CAD) of an engine; verifying the CAD file by analyzing the internal channels and paths of each layer; converting the CAD file into a Standard Triangle Language (hereinafter, "STL") file to form the engine as meshes of triangles; slicing the STL file into multiple layers; pre-processing the powder to adhere to the printer manufacturer's standards; depositing the powder in a build platform; selectively fusing powders in a powder bed by melting the powder using a laser source; spreading the new layer of powder over a previously deposited layer by moving down the build platform; repeating the above steps to obtain the single-piece, integrated 3D printed engine; de-powdering the printed part to remove the un-melted powders; applying pneumatic pressure from one end of the ports to remove the residue of powders left inside the internal channels; verifying the 3D printed engine parts using CT scan; and heat treating the engine and removing the designed 3D printed integrated engine from the build platform.

While designing the engine, the design iterations are done in the following areas to get an optimized design with considerations of functions and 3D printing: igniters (e.g. flame torch, Pyrotechnic and Pyrophoric igniters are iterated), injectors (e.g. Pintle, coaxial, showerhead types with different geometries are iterated), nozzle and regenerative cooling channels.

In accordance with present invention, in the single piece 3D printed engine, hundreds of design iterations result in reducing the number of subcomponents. Using 3d printing, it is possible to manufacture parts additively (as opposed to subtractive manufacturing). The single piece engine design carefully allows for the engine to be additively created in a 3D printer without any need for other manufacturing process.

The engine of the present invention is useful for satellite launch vehicles, satellites and other space exploration vehicles.

Since, there are no bolts, screws, welds etc. the engine is extremely light compared to engines of the similar thrust rating. When using the 3D printed engine having lesser mass in space vehicles, the cost of the launching vehicles as well as the cost of the mission will be reduced further.

The objective and advantages of the present invention will become more evident from the following detailed description when taken in conjunction with the accompanying drawings.

BRIEF DESCRIPTION OF THE DRAWINGS

The objective of the present invention will now be described in more detail with reference to the accompanying drawings, in which:

FIGS. 1(a) to 1(e) illustrates the design of subcomponents of injectors and injector plate of an engine in CAD tool;

FIGS. 2(a) to (d) illustrates the design of subcomponents of igniter of an engine in CAD tool;

FIGS. 3(a) to (f) illustrates the design of subcomponents of regenerative cooling channels of an engine in CAD tool;

REFERENCE NUMERALS

100—Build platform
102—Laser source
104—Parts/areas
500—Perspective view
502—Igniter
504—Injector plate
506—Nozzle
508—Regenerative cooling channels

DETAILED DESCRIPTION OF THE INVENTION

The present invention discloses a method for additively manufacturing a single piece, integrated, cost-effective engine used in space vehicles.

The single piece, integrated engine comprises: a combustion chamber to ignite the fuel and Oxidizer mixture, an injector plate including multiple injector elements as shown in FIGS. 1(a) to 1(e) to inject the atomized mixture of the fuel and oxidizer to the combustion chamber, an igniter to ignite the fuel mixture and to provide a flame to ignite the main propellants injected into the combustion chamber as shown in FIGS. 2(a) to 2(d), a nozzle integrated into combustion chamber to eliminate the use of flanges or any mechanical interfaces to pass the hot gas to produce thrust, regenerative cooling channels as shown in FIGS. 3(a) to 3(f) to circulate the fuel around and cools the engine to maintain operating temperature where all of these components are fused and integrated in their very creation process itself by additive manufacturing method.

According to present invention, the method of additively manufacturing a single piece engine comprises the steps of: generating the Computer-Aided Design (CAD) of an engine; verifying the CAD file by analyzing the internal channels and paths of each layer using computational fluid mechanics and 3D modeling; converting the CAD file into a Standard Triangle Language (hereinafter, "STL") file to convert into a surface file, which contains meshes of triangles; slicing the STL file into multiple layers; pre-processing and characterizing a powder to adhere to the printer manufacturer's standards; spreading a layer of powder on a build platform (100); depositing the powder in a build platform; selectively fusing powders in a powder bed by melting the powder using a laser source; spreading the new layer of powder over a previously deposited layer by moving down the build platform; repeating the above steps to obtain the single-piece, integrated 3D printed engine; de-powdering the printed part to remove the un-melted powders; applying pneumatic pressure from one end of the ports to remove the residue of powders left inside the internal channels; verifying the 3D printed engine parts using CT scan; and heat treating the engine and removing the designed 3D printed integrated engine from the build platform.

Figure 4A:
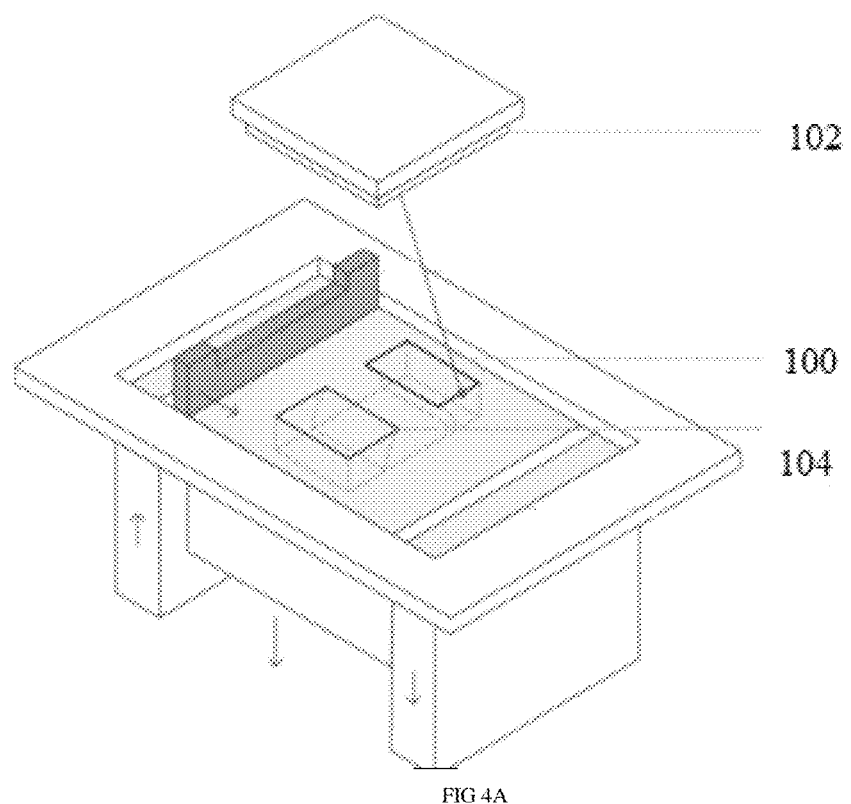
FIGS. 4(a) and 4(b) shows the setup of Laser powder bed manufacturing process in accordance with present invention.
Figure 4B:
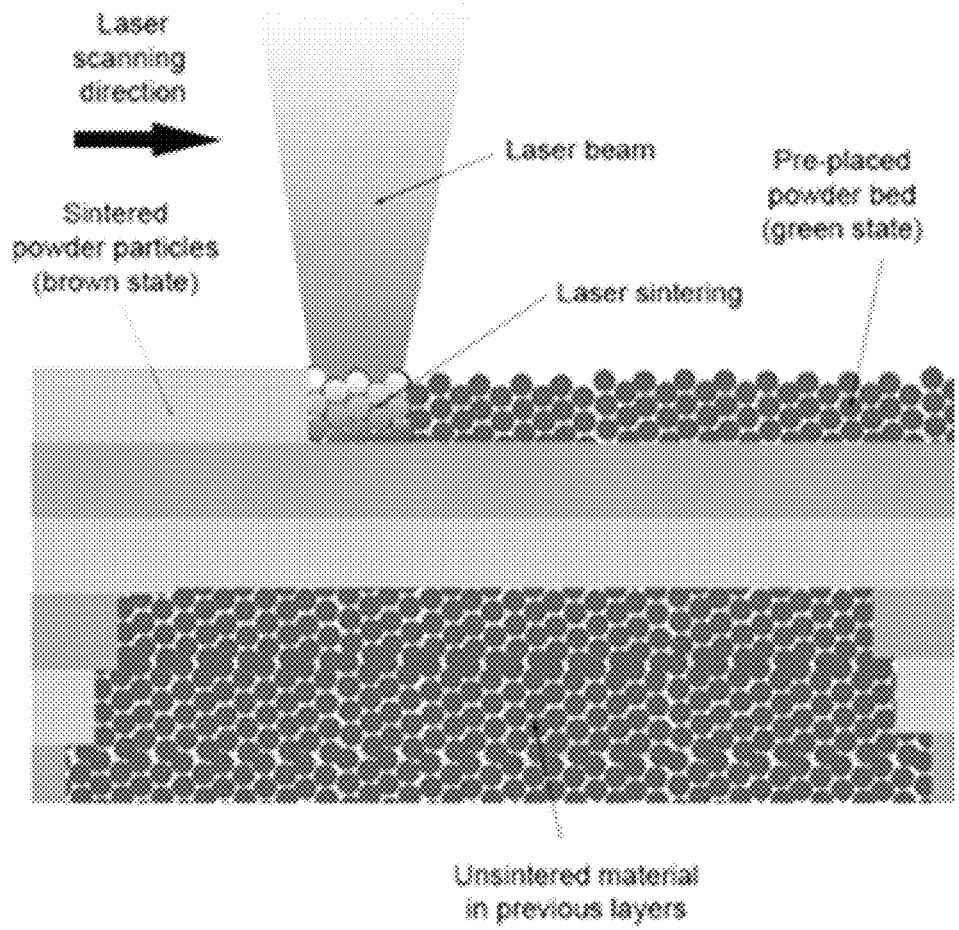

In accordance with the present invention, the CAD file of the engine is sliced into multiple layers. Layer-by-layer, the engine is grown using laser powder bed fusion technology. In this technology, each part of the engine is simultaneously grown in an integrated fashion, along the length of the engine. The basic process of additive manufacturing using laser powder bed fusion is shown in FIGS. 4(a) & 4(b). First a layer of powder is spread on the build platform (100) and a laser source (102) is used to melt the powder in the selective areas (104). Once that layer is completed, the build platform (100) moves down and a new layer of powder is spread over the previous layer. The process is continued until the complete part is made.

Figure 5:
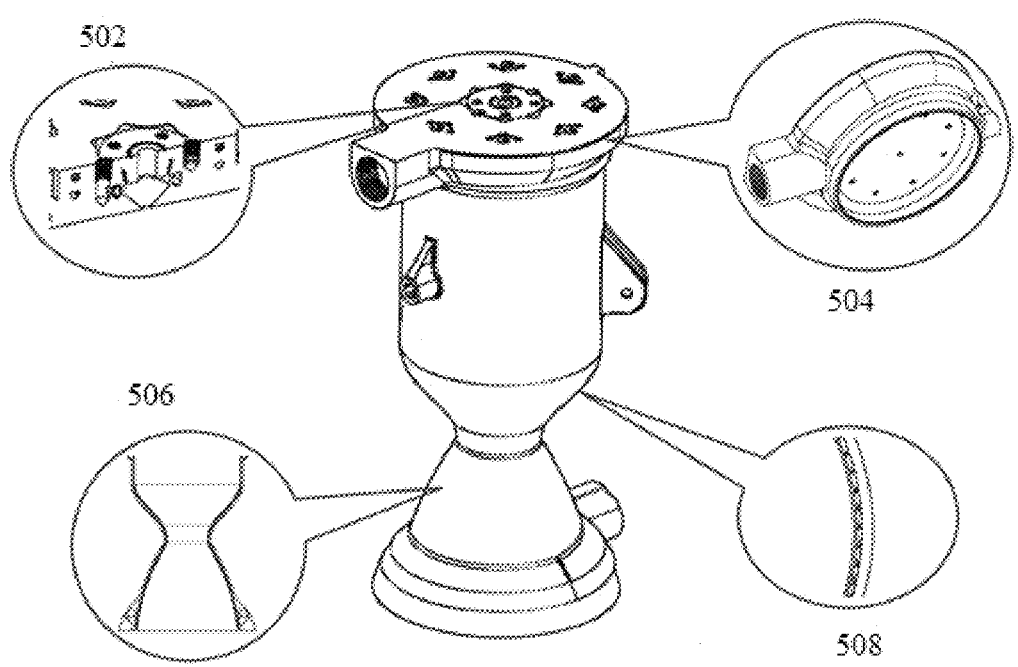
FIG. 5 illustrates the overall design of the 3D printed engine of present invention.
Figure 6:
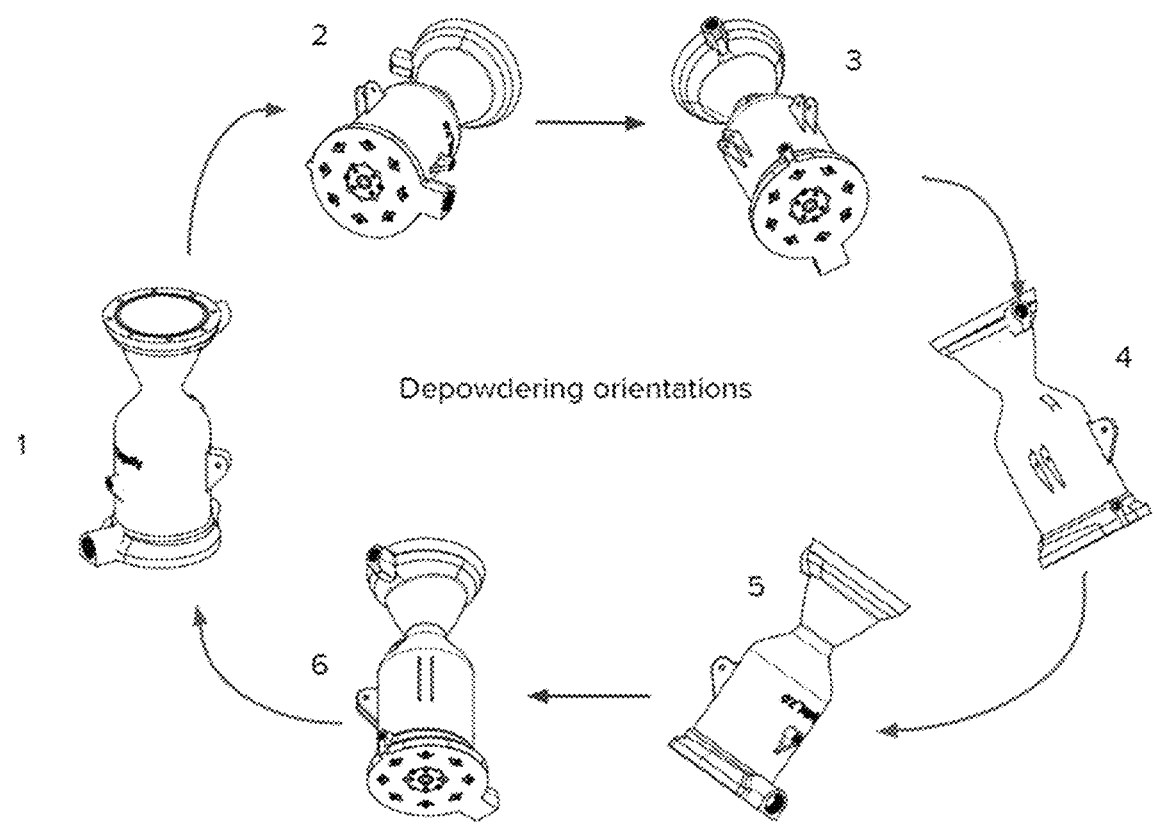
FIG. 6 provides the dimensional specifications of the engine

While designing the engine, the design iterations are done in the following areas to get an optimized design with considerations of functions and 3D printing: igniters (e.g. flame torch, Pyrotechnic and Pyrophoric igniters are iterated), injectors (e.g. Pintle, coaxial, showerhead types with different geometries are iterated), nozzle and regenerative cooling channels. The overall design of the 3D printed engine of present invention is shown in FIG. 5 and its dimensional specifications are illustrated in FIG. 6.

Figure 7:
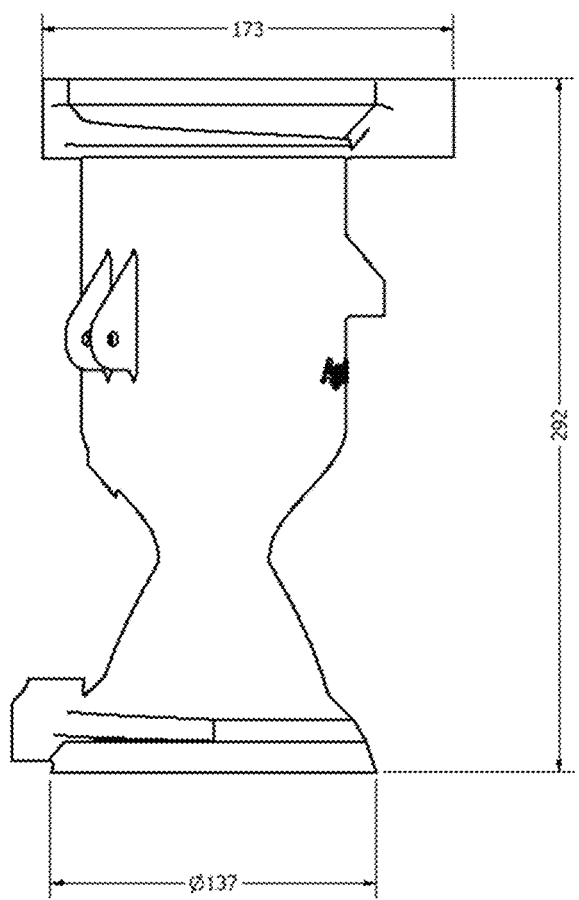
FIG. 7 illustrates the perspective view of the 3D printed engine of the present invention.

In the present invention, referring to FIG. 7, the CAD design of the engine (500) includes all the parts such as igniters (502), injectors and injector plate (504), cooling channels (508), thrust chamber and nozzle (506) integrated to one piece. The CAD file verification is completed by analyzing each layer to ensure if the internal channels and paths are made such that there are no supports formed since the supports formed may block the path and will be difficult to remove.

Further, in accordance with the present invention, powder is characterized to measure/analyze the particle size distribution, flowability, tap density and material composition. This characterization is compared with the 3D printer manufacturer standards in order to obtain the desired mechanical properties. Commonly used metallic powders includes, but not limited to, Inconel 718 and CuCrZr alloys.

According to the present invention, de-powdering is done using a rotating vibration table. Engine along with the build platform is loaded on the rotating table. It is then rotated in different orientations such that the un-melted powders are removed from the part. Finally, pneumatic pressure is applied from one end of the ports to remove the residue of powders left inside the internal channels.

In an embodiment, the single piece integrated engine of the present invention is manufactured by additive manufacturing methods like direct metal laser sintering, laser melting or electron beam melting.

De-powdering is the most critical process in direct metal laser sintering method especially for a single piece engine. The engine design aids in de-powdering without compromising the core engine design and also its dimensional accuracy is very high due to the high resolution of the 3D-printer itself.

Figure 8:
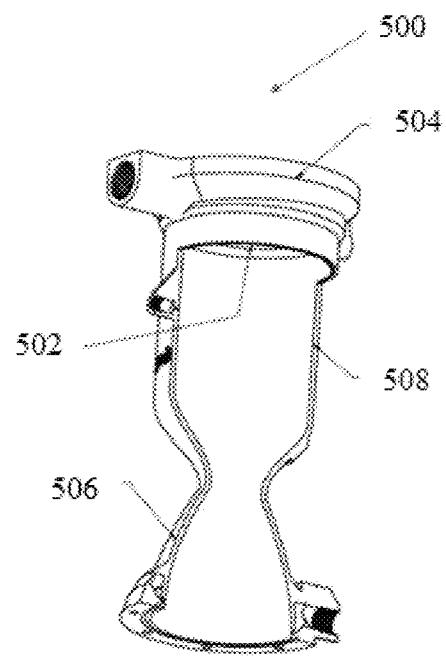
FIG. 8 illustrates the various de-powdering orientations of the engine.

Once all the parts of the engine are 3D printed, all the internal cooling channels and the complete part is covered in powder. The design aids the removal of powders from the internal cavities. All the internal channels are connected to openings at both ends. This will ease the de-powdering easily by applying pneumatic pressure. Powder is removed from the channels by the pressure through the other end. This help to avoid adding extra ports for removing powder from complex channels. FIG. 8 illustrates the different orientations the engine has to be kept for de-powdering.

Figure 9:
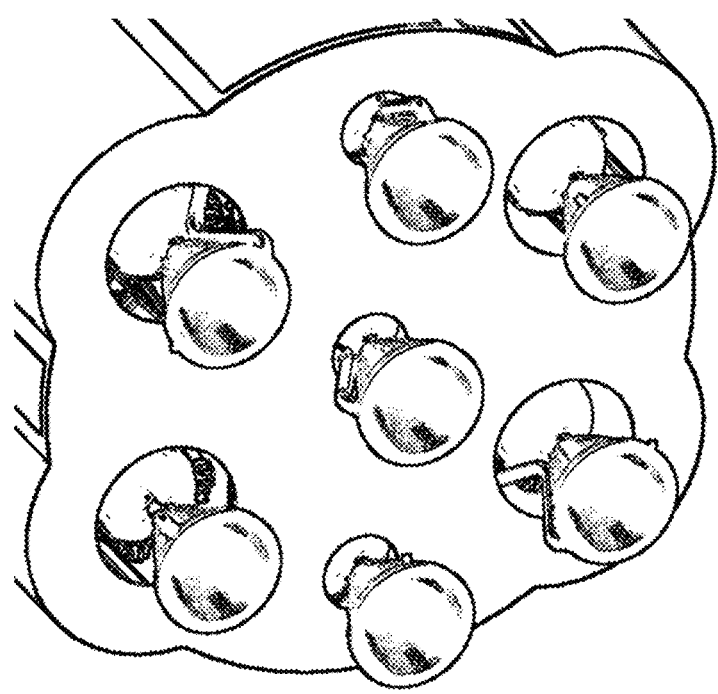
FIG. 9 shows the engine designed in clustered configuration in a satellite launch vehicle.

According to an embodiment of the present invention, the designed single piece integrated engine can be used in a clustered configuration in the satellite launch vehicles as shown in FIG. 9.

The advantages of the design of single piece 3D printed engine manufactured by the proposed method, include, but not limited to:

Every single engine component can be 3D printed

Every single component can be 3D printed in the same component, simultaneously

Un-melted powder from the component (s) can be removed without additional manual fabrication processes.

No human intervention required during manufacturing processes

Takes less than 96 hours to make/manufacture an entire rocket engine

Less mass than similar engines to produce the same amount of thrust

Every realized version of the engine is accurately replicable because of the lack of human intervention in the manufacturing process Also, the single integrated engine is manufactured using high grade aerospace materials which further makes the engine lighter. The high-grade aerospace materials are chosen from the group of materials such as copper and its alloys, Inconel, Monel and titanium.

The 3D printed engine of the present invention is useful for satellite launch vehicles, satellites and other space exploration vehicles. The present invention is also applicable to any type of vehicle that requires a light weighted and cost-effective engine.

Thus, the advantages of the present invention including, but not limited to: safety of the single integrated engine is higher due to the avoidance of attachments points between different components. Manufacturing the engine as a single piece helps in identifying the errors much easier when compared to the traditionally assembled multiple component engine, and therefore qualification is easier, and quicker.

Further, the additive manufacturing methods leads to a faster batch production and hence time required to assemble the engine is lesser. Further, the mass of the additively manufactured single piece engine (e.g. 5-6 kgs) is lesser than the conventionally manufactured engines (e.g. 20-25 kgs) because of avoidance of bolts, seals and other interface joints. Lower mass of the engine results in reducing overall mass of the vehicle and thereby cost of the mission reduces as well.

Moreover, the machining work is reduced leading to a quick turnaround time, with less human intervention in the manufacturing process. Quicker turnaround time of engine fabrication makes the assembly process quicker and thereby helps in frequent launches. The turnaround time for the engine fabrication is around 3 days and qualified for flying within a week. This makes the assembly of the launch vehicle quick and affordable.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention as claimed.

What is claimed is:

1. A method of additively manufacturing a single-piece 3D printed integrated engine for a satellite launch vehicle, comprising the steps of:
   a. slicing a Computer-Aided Design (CAD) file of a single-piece three dimensional (3D) printed integrated engine into multiple layers, wherein the CAD design of the single-piece 3D printed integrated engine comprises a combustion chamber, injectors, igniters, a nozzle, an injector plate and regenerative cooling channels, all incorporated into a unified piece, wherein the CAD design of the single-piece 3D printed integrated engine is formed to aid in the removal of un-melted powders from internal channels while maintaining its design, thereby eliminating attachment points between different components to improve engine safety and reliability;

b. verifying the CAD file of the single-piece 3D printed integrated engine by analyzing the internal channels and paths of each layer using computational fluid mechanics and 3D modeling to ensure the internal channels and the paths are formed without support structures to ease the removal of un-melted powder, and all internal channels are connected to openings at both ends, thereby avoiding the need for additional ports for powder removal and the design of the single-piece 3D printed integrated engine is not compromised;

c. growing the single-piece 3D printed integrated engine layer-by-layer using laser powder bed fusion technology by
   i. spreading a layer of pre-processed powder on a build platform;
   ii. selectively fusing powders in a powder bed by melting the powder using a laser source;
   iii. spreading a new layer of powder over a previously deposited layer by moving down the build platform; and
   iv. repeating the steps i to iv until the single-piece 3D printed integrated engine is fully formed, wherein each part of the single-piece 3D printed integrated engine is simultaneously grown in an integrated fashion along the length of the single-piece 3D printed integrated engine using the laser powder bed fusion technology, wherein all the internal channels and the parts are covered in the powder if all the parts of the single-piece 3D printed integrated engine are 3D printed, wherein the design of the single-piece 3D printed integrated engine that is formed aids in de-powdering without the need for extra ports and reduces the mass of the single-piece 3D printed integrated engine by eliminating bolts, seals, and interface joints, d. de-powdering the printed part to remove the un-melted powders using a rotating vibration table, wherein the rotating vibration table is rotated in different orientations to remove the un-melted powders from the printed part; and e. applying pneumatic pressure from one end of ports to remove residue of powders left inside the internal channels of the single-piece 3D printed integrated engine.

2. The method of claim 1, wherein the igniters are selected from a group comprising flame torch, Pyrotechnic, and Pyrophoric igniters.

3. The method of claim 1, wherein the injectors are selected from Pintle, coaxial, or showerhead types with variable geometries.

4. The method of claim 1, further comprises verifying the parts of the single-piece 3D printed integrated engine using a CT scan.

5. The method of claim 1, comprises heat treating the single-piece 3D printed integrated engine and removing the single-piece 3D printed integrated engine from the build platform.

6. A single-piece 3D printed integrated engine in a satellite launch vehicle, comprising the single-piece 3D printed integrated engine comprising:

a. an injector plate including multiple injector elements to inject an atomized mixture of fuel and oxidizer into a combustion chamber;

b. the combustion chamber to burn the atomized mixture of fuel and oxidizer;

c. an igniter to ignite the atomized mixture of fuel and oxidizer and to provide a flame to ignite main propellants injected into the combustion chamber;

d. a nozzle integrated into the combustion chamber to eliminate use of flanges or any mechanical interfaces to pass hot gas and to produce thrust; and e. regenerative cooling channels to circulate the fuel around and cool the single-piece 3D printed integrated engine to maintain operating temperature, wherein the single-piece 3D printed integrated engine components in (a) to (e) are integrated by an additive manufacturing method to form the single-piece 3D integrated printed engine, wherein the additive manufacturing method comprises the steps of:

slicing a Computer-Aided Design (CAD) file of the single-piece three dimensional (3D) printed integrated engine into multiple layers, wherein the CAD design of the single-piece 3D printed integrated engine comprises the combustion chamber, injectors, the igniter, the injector plate, the nozzle integrated into the combustion chamber, and the regenerative cooling channels, all incorporated into a unified piece, wherein the CAD design of the single-piece 3D printed integrated engine is formed to aid in the removal of un-melted powders from internal channels while maintaining its design, thereby eliminating attachment points between different components to improve engine safety and reliability;

verifying the CAD file of the single-piece 3D printed integrated engine by analyzing internal channels and paths of each layer using computational fluid mechanics and 3D modeling to ensure the internal channels and the paths are formed without support structures to ease the removal of un-melted powder, and all the internal channels are connected to openings at both ends, thereby avoiding the need for additional ports for powder removal and the design of the single-piece 3D printed integrated engine is not compromised;

growing the single-piece 3D printed integrated engine layer-by-layer using laser powder bed fusion technology by
   i. spreading a layer of pre-processed powder on a build platform;
   ii. selectively fusing powders in a powder bed by melting the powder using a laser source;
   iii. spreading a new layer of powder over a previously deposited layer by moving down the build platform;
   iv. repeating the steps i to iii until the single-piece 3D printed integrated engine is fully formed, wherein each part of the single-piece 3D printed integrated engine is simultaneously grown in an integrated fashion along the length of the single-piece 3D printed integrated engine using the laser powder bed fusion technology, wherein all the internal channels and the parts are covered in the powder if all the parts of the single-piece 3D printed integrated engine are 3D printed, wherein the design of the single-piece 3D printed integrated engine that is formed aids in de-powdering without the need for extra ports and reduces the mass of the single-piece 3D printed integrated engine by eliminating bolts, seals, and interface joints, de-powdering the printed part to remove the un-melted powders using a rotating vibration table, wherein the rotating vibration table is rotated in different orientations to remove the un-melted powders from the printed part; and applying pneumatic pressure from one end of ports to remove residue of powders left inside the internal channels of the single-piece 3D printed integrated engine.

7. The single-piece 3D printed integrated engine of claim 6, wherein the igniter has a spark plug which ignites the atomized mixture of fuel and oxidizer and produces a flame, which ignite the main propellants.

8. The single-piece 3D printed integrated engine of claim 6, wherein the single-piece 3D printed integrated engine is additively manufactured with aerospace materials.

9. The single-piece 3D printed integrated engine of claim 8, wherein the aerospace materials are selected from a group comprising copper and its alloys, Inconel, Monel, and Titanium.

* * * * *